United States Patent
Baudasse et al.

(10) Patent No.: US 9,242,744 B2
(45) Date of Patent: Jan. 26, 2016

(54) MOTORIZATION SYSTEM WITH TORQUE SUITABLE FOR HINGE WITH CROSSED WINDING MEANS

(71) Applicant: THALES, Neuilly-sur-Seine (FR)

(72) Inventors: Yannick Baudasse, Cannes la Bocca (FR); Stephane Vezain, Cannes la Bocca (FR); Yasmina Gafiri, Cannes la Bocca (FR)

(73) Assignee: Thales (FR)

( * ) Notice: Subject to any disclaimer, the term of this patent is extended or adjusted under 35 U.S.C. 154(b) by 105 days.

(21) Appl. No.: 14/061,896

(22) Filed: Oct. 24, 2013

(65) Prior Publication Data

US 2014/0117164 A1 May 1, 2014

(30) Foreign Application Priority Data

Oct. 26, 2012 (FR) ...................................... 12 02859

(51) Int. Cl.
*B64G 1/22* (2006.01)
*B25J 17/02* (2006.01)
*B64G 1/44* (2006.01)
*E05D 1/02* (2006.01)

(52) U.S. Cl.
CPC ............. *B64G 1/222* (2013.01); *B25J 17/0241* (2013.01); *B64G 1/443* (2013.01); *E05D 1/02* (2013.01); *Y10T 16/547* (2015.01)

(58) Field of Classification Search
CPC ...... E05D 1/02; Y10T 16/547; B25J 17/0241; B64G 1/222
See application file for complete search history.

(56) References Cited

U.S. PATENT DOCUMENTS

| | | | |
|---|---|---|---|
| 3,525,483 A | 8/1970 | Alstyne | |
| 3,945,053 A | 3/1976 | Hillberry et al. | |
| 4,558,911 A * | 12/1985 | Ruoff ....................... | B25J 9/104 338/79 |
| 5,082,212 A * | 1/1992 | Vezain ................... | B64G 1/222 244/172.6 |
| 5,086,541 A | 2/1992 | Auternaud et al. | |
| 6,505,381 B1 * | 1/2003 | Thomson ............... | B64G 1/222 16/282 |
| 8,151,414 B2 | 4/2012 | Baudasse et al. | |
| 2009/0282646 A1 * | 11/2009 | Baudasse et al. ............... | 16/273 |
| 2011/0147532 A1 | 6/2011 | Chaix et al. | |
| 2012/0137801 A1 * | 6/2012 | Baudasse et al. ............ | 74/89.14 |

FOREIGN PATENT DOCUMENTS

| | | |
|---|---|---|
| EP | 0620466 A1 | 10/1994 |
| EP | 2336031 A1 | 6/2011 |
| FR | 2635077 A1 | 2/1990 |
| FR | 2902763 A1 | 12/2007 |
| FR | 2968234 A1 | 6/2012 |

* cited by examiner

*Primary Examiner* — Brian M O'Hara
(74) *Attorney, Agent, or Firm* — Baker & Hostetler LLP

(57) ABSTRACT

A motorization device comprises two substantially parallel winding cylinders, at least one longitudinal link element to maintain a predetermined distance between the cylinders, and wound around said winding tracks, the link element consequently having a crossover point between the winding cylinders, two flexible tracks fixed to the winding cylinders and arranged facing and in contact with one another at the point of contact, a winding cylinder and flexible track assembly forming a fitting, a prestressing force being applied at the point of contact under the effect of the link element. The flexible tracks have a spiral form configured that the point of contact between the two flexible tracks in spiral form, situated between said winding cylinders, is offset relative to the crossover point, such that a torque dependent on the distance between the point of contact and the crossover point is applied, to provoke the mutual rotation of the fittings.

5 Claims, 2 Drawing Sheets

MOTORIZATION SYSTEM WITH TORQUE SUITABLE FOR HINGE WITH CROSSED WINDING MEANS

CROSS-REFERENCE TO RELATED APPLICATION

This application claims priority to foreign French patent application No. FR 1202859, filed on Oct. 26, 2012, the disclosure of which is incorporated by reference in its entirety.

FIELD OF THE INVENTION

The present invention relates to the motorization systems of elements. It applies notably to the field of mechanisms for deploying space appendages, such as antennas or solar generators for example.

In the abovementioned motorization systems, elements, for example fittings, are typically set in motion relative to one another around hinges. These systems thus comprise lines of hinges that generally use motorization components of torsion spring, spiral spring or Carpentier joint type, making it possible to counter the resisting torques and guarantee the necessary margins in terms of torques generated in order to ensure the complete deployment of the appendages.

BACKGROUND

In this context, the known motorization components exhibit a changing or variable motorization torque demanding an over-motorization which results in shocks at the end of deployment.

These shocks can be significant and generate damage to the space appendages at the end of deployment, as well as stray torques damaging the piloting of the spacecraft. To mitigate this problem, the deployable structures can be dimensioned and reinforced so as to withstand the end-of-travel shocks generated in their deployment, but this solution is unsatisfactory and notably results in an increased weight for the complete structure.

Some lines of development have led to the devising of deployment mechanisms with almost zero resistive torque. Such mechanisms, such as the line of hinges described in the patent application FR 2635077, offer the advantage of requiring only little motorization power and generate minimized end-of-travel shocks. Other mechanisms are borne from enhancements made to the above mechanism, notably in terms of weight and volume. Such a deployment mechanism is disclosed in the patent application FR 0605653.

The known mechanisms, such as those described in the abovementioned patent applications FR 2635077 and FR 0605653, have an angular deployment capability that is limited to 180°. Moreover, their overall kinematics, because of their structure, generate very irregular motorization torques. Finally, the speed of deployment of the known deployment mechanisms, as already explained, results in a restoration of energy at the end of travel, and therefore a shock, because said speed of deployment is not regulated.

To correct these drawbacks, a motorization device has been proposed with controlled torque, described in the patent application published under the reference FR 2968234. Such a device makes it possible to offer an almost zero resisting torque, and is based on the use of flexible tracks that already exist in the system, to produce the motorization. A specific form is given to the flexible tracks so as to allow for an offsetting of the point of contact between the flexible tracks relative to the crossover point of winding means such as wound flexible blades or else cables, forming a link element between two substantially parallel, fitting-forming winding cylinders, to which various components of the system are linked. In this way, a torque dependent on the distance between the abovementioned point of contact and crossover point provokes mutual rotation of the flexible tracks, and the mutual rotation of the fittings. The "crossover point" between the link element-forming winding means should be understood in the wider sense to be the axis substantially parallel to the longitudinal axes or axes of revolution of the fittings, passing at the same time through the two winding means.

In the abovementioned device, a good control of the motorization torque presupposes a good control of the position of the point of contact between the flexible tracks, but it may in practice prove not so easy to thus control the position of the point of contact between the flexible tracks.

SUMMARY OF THE INVENTION

One aim of the present invention is notably to mitigate the abovementioned drawbacks. Thus it is proposed, through the present invention, that the offsetting of the point of contact between the flexible tracks relative to the crossover point of the winding means be ensured not only by a specific form of the flexible tracks, but also by a specific configuration of the winding means around the winding cylinders.

More specifically, the subject of the invention is a motorization device comprising:

two substantially parallel winding cylinders, longitudinal link element-forming winding means, the winding means being capable of maintaining a predetermined distance between the winding cylinders and being wound around winding cylinders, the winding means consequently having a crossover point between two substantially linear sections of the link element situated between the winding cylinders, and at least two flexible tracks, an assembly comprising a winding cylinder and a flexible track forming a fitting, a flexible track being fixed to each winding cylinder, the flexible tracks being arranged facing one another and having a point of contact, a prestressing force being applied at said point of contact of the flexible tracks under the effect of the winding means, the flexible tracks having a spiral form, the form of the spiral being configured in such a way that the point of contact between the two flexible tracks is offset relative to the crossover point of the winding means, the point of contact and the crossover point not being aligned on one and the same axis parallel to the axes of revolution of the winding cylinders, so that a torque dependent on the distance between the point of contact and the crossover point is applied, the torque being able to provoke the mutual rotation of the fittings.

Each winding cylinder has a first circumference over a determined first portion, and a second circumference over a determined second portion, each linear section of the link element being wound on the first portion of the first winding cylinder and on the second portion of the second winding cylinder, or on the second portion of the first winding cylinder and on the first portion of the second winding cylinder.

In one embodiment of the invention, said first portion and said second portion of the first winding cylinder and of the second winding cylinder can have a circular circumference.

In one embodiment of the invention, the winding means and the winding cylinders can be configured such that the value of a first distance between the crossover point and a horizontal plane containing the respective axes of revolution of the first and second winding cylinders is equal to a determined first value, for controlling the torque that is exerted at the point of contact between the fittings.

In one embodiment of the invention, the form of the spiral of the flexible tracks can also be configured in such a way that a second distance between the point of contact and the plane containing the respective axes of revolution of the first and of the second winding cylinders is equal to a determined second value, the distance equalling the sum of the first distance and of the second distance determining the torque that is exerted on the fittings.

Another subject of the present invention is a deploying system for satellite, comprising at least one first deployable appendage, one second deployable appendage, and a motorization device according to any one of the embodiments described, the deployable appendages being fixed to each fitting.

BRIEF DESCRIPTION OF THE DRAWINGS

Other features and advantages of the invention will become apparent from the following description, given in light of the appended drawings which represent.

DETAILED DESCRIPTION

Figure 1:
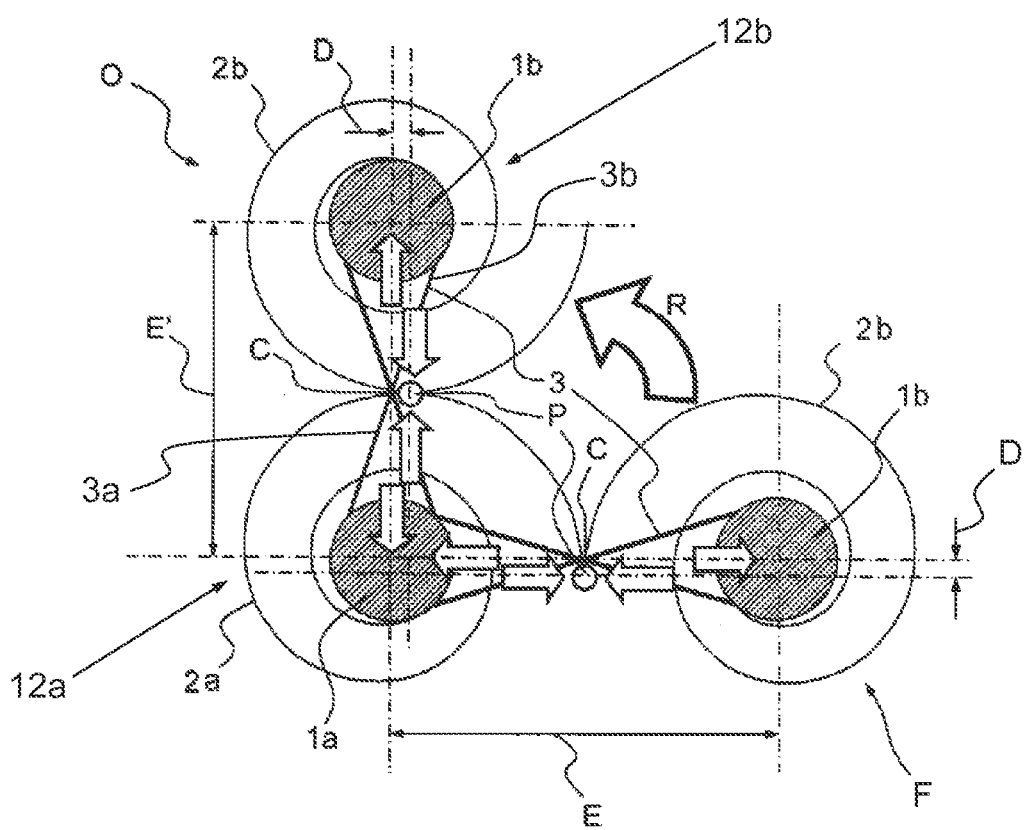
FIG. 1: a diagram of a motorization system known from the prior art, in the stowed and deployed positions.

FIG. 1 shows a diagram illustrating a motorization system as described in the abovementioned patent application FR 2968234. A motorization system comprises substantially parallel winding cylinders $1a$, $1b$ held in position by winding means 3 such as flexible blades, or by any other suitable element, such as, for example, cables. The winding means 3 are wound in a figure of eight around winding cylinders $1a$, $1b$; taken separately, each winding means notably comprises a linear portion $3a$ or $3b$, each linear portion $3a$, $3b$ being extended by a portion of the winding means that winds around each of the winding cylinders $1a$, $1b$. The winding means cross at a crossover point C.

Flexible tracks $2a$, $2b$, are respectively connected to each of the winding cylinders $1a$, $1b$ with circular section. The flexible tracks $2a$, $2b$ are arranged facing one another and in contact with one another. An assembly comprising a winding cylinder $1a$, $1b$ and an associated flexible track $2a$, $2b$ forms a fitting $12a$, $12b$. The winding means 3 induce a prestressing force that is applied at the point of contact P between the flexible tracks $2a$, $2b$. Because of the basically circular geometry of the winding cylinders $1a$, $1b$ and of the flexible tracks, the point of contact P between the flexible tracks $2a$, $2b$ and the crossover point C of the winding means 3 are aligned on a plane orthogonal to the plane passing through the two axes of revolution of the winding cylinders $1a$, $1b$, and parallel and equidistant from the axes of revolution of the two winding cylinders $1a$, $1b$. Appendages, such as solar generators, can be fixed to each winding cylinder/flexible track assembly $1a$-$2a$/$1b$-$2b$.

The flexible tracks $2a$, $2b$ can consist of flexible tracks in spiral form. The profile of the flexible tracks $2a$, $2b$ can also be formed by a plurality of spiral portions, and/or by a plurality of portions of circular profile. The specific spiral form makes it possible to offset the point of contact P between flexible tracks $2a$, $2b$ relative to the crossover point C of the winding means 3. The point of contact P and the crossover point C are not located on the same axis parallel to the axes of revolution of the winding cylinders $1a$, $1b$. This offset by a distance D, from the point of contact P relative to the crossover point C, leads to the offsetting of the prestressing force induced by the winding means 3 and that is applied at the point of contact P. Because of this, a torque R is produced between the point of contact P and the crossover point C inducing the rotation of the fittings $12a$, $12b$, comprising the flexible tracks $2a$, $2b$ and the winding cylinders $1a$, $1b$. Mutual rotation of the fittings $12a$, $12b$, because of the spiral form of the flexible tracks $2a$, $2b$, results in a variation in the deformation of the flexible tracks $2a$, $2b$ and, more specifically, of the deflection at the point of contact, the centre-to-centre distance between the winding cylinders $1a$, $1b$ being, for its part, constant, the length E of the centre-to-centre distance in the closed position F equalling the length E' of the centre-to-centre distance in the open position O, because of the cylindrical form with circular section of the winding cylinders $1a$ and $1b$.

The torque R can be adjusted by means of the choices made on the form of the spiral and on the physical characteristics of the flexible tracks $2a$, $2b$, in particular their elasticity and their rigidity. To increase the torque R exerted on the flexible tracks $2a$, $2b$, it is possible to increase the offset of the point of contact P relative to the crossover point C by producing a spiral with a significant aperture angle, or to increase the force exerted at the point of contact P by producing a stiffer flexible track. To increase the force exerted at the point of contact C, it is also possible to increase the deflection of the flexible tracks $2a$, $2b$.

To generate a torque R that is constant during the deployment phase, an Archimedean spiral form may be preferred.

The motorization torque R can also be adapted in order to compensate certain variable friction torques introduced by elements external to the hinge. These may typically be bundles of electrical cables conveying the electricity between two solar generator panels. It is thus possible to obtain a motorization margin that is almost constant throughout the deployment. The motorization demand can then be adjusted as strictly necessary.

Figure 2A:
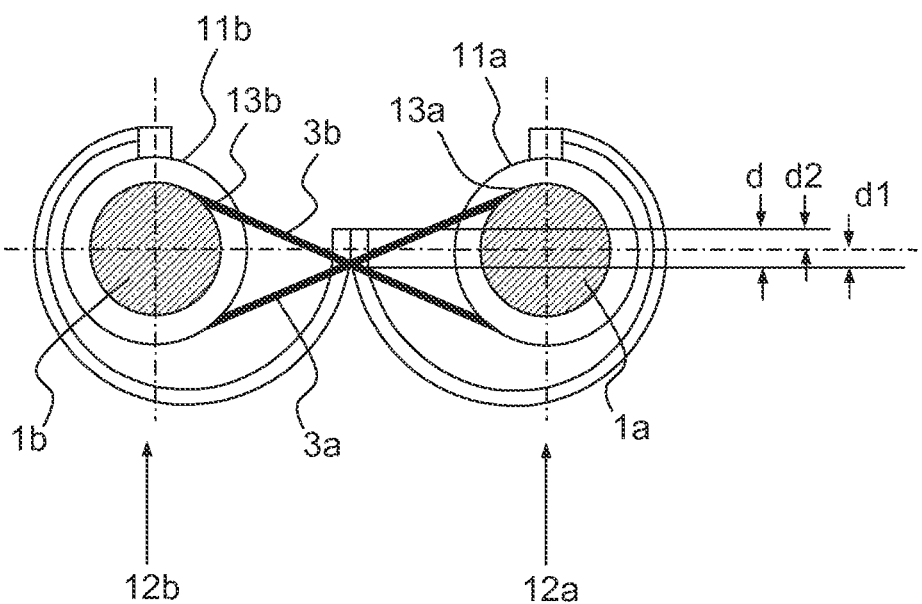
FIGS. 2A and 2B: a diagram illustrating respectively a motorization device according to an exemplary embodiment of the invention, and a summary of the forces that are applied thereto.
Figure 2B:
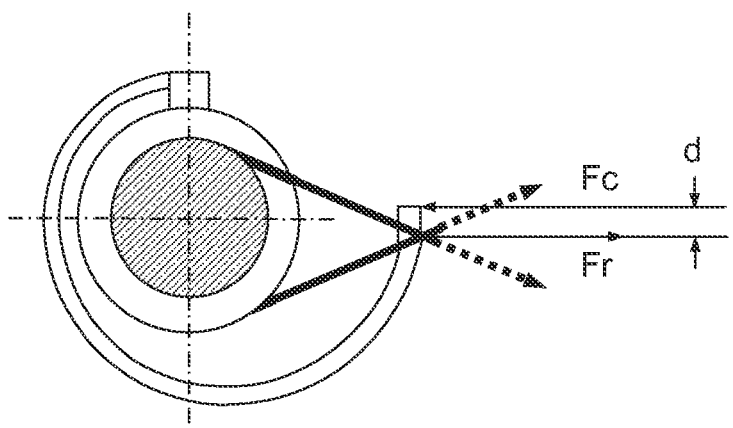

FIGS. 2A and 2B respectively show a diagram illustrating a motorization device according to an exemplary embodiment of the invention, and a summary of the forces that are applied thereto.

According to the present invention, an alternative technique to the invention of the abovementioned patent application FR 2968234 is proposed, that makes it possible to increase the offset of the point of contact P relative to the crossover point C by displacing the crossover point C itself.

To this end, it is proposed that the circumference of the winding cylinder of at least one fitting not be constant along the longitudinal axis of the fitting.

In the example illustrated in FIG. 2A, each winding cylinder $1a$, $1b$ has a circular section and is defined by a first diameter over a determined first portion $11a$, $11b$, and a second diameter over a determined second portion $13a$, $13b$.

According to a particular feature of the present invention, the crossover point C is offset from the point of contact P by a shrewd arrangement of the link means and of the abovementioned determined portions of the winding cylinders. In the example illustrated by the figure, a first linear section $3a$ of the link element is wound around the first portion $13a$ of the first winding cylinder $1a$ and on the second portion $11b$ of the second winding cylinder $1b$. Still in the example illustrated by the figure, the circumference or the diameter of the second portion $13a$ of the first winding cylinder $1a$ is smaller than the circumference or the diameter of the first portion 11a. Similarly the circumference or the diameter of the second portion 13b of the second winding cylinder 1b is smaller than the circumference or the diameter of the first portion 11b. Obviously, the converse of the above proposition can also be envisaged.

It should be noted that the example illustrated by FIG. 2A is not limiting on the present invention, and that other embodiments can be envisaged, for example in which the winding cylinders comprise a plurality greater than two of portions having different diameters or circumferences, in order, for example, to allow for an adjustment to different desired applications, using identical parts.

Other embodiments can also be envisaged, in which the sections of the diameters on the different portions are not necessarily circular, in order to adjust the torque curve over the travel of the elements in motion.

In addition to the offset of the crossover point C that is thus obtained via the particular configuration given to the windings of the linear sections 3a, 3b of the winding means 3 forming link elements between the fittings, an additional offset can be obtained by offsetting the point of contact P between the flexible tracks 2a, 2b relative to a plane through which pass the respective longitudinal axes of the two fittings, in a manner similar to the invention that is the subject of the abovementioned patent application FR 2968234.

As is illustrated by FIG. 2A, a first offset by a first distance d1 between the crossover point C and the plane containing the axes of revolution of the winding cylinders 1b can be obtained by the winding of the winding means 3 respectively on different diameters of the winding cylinders, and a second offset by a second distance d2 can be obtained by offsetting the point of contact P between the flexible tracks 2a, 2b, the total offset between the point of contact P and the crossover point C having a distance d which then equals the sum of the first distance d1 and of the second distance d2.

Thus, it is possible to configure the winding means and the winding cylinders, such that the value of the first distance d1 is equal to a determined first value, to control the torque that is exerted at the point of contact C between the flexible tracks 2a, 2b.

It is also possible to also configure the form of the section of the flexible tracks 2a, 2b, for example spiral, such that the value of the second distance d2 is equal to a determined second value and that the sum of the first distance d1 and of the second distance d2 equals a determined value d that makes it possible to control the torque that is exerted at the point of contact C.

Now with reference to FIG. 2B, the winding of the flexible winding means around winding tracks formed by the respective portions of the winding cylinders dictates the kinematics of the system as a whole and consequently the deflection, that is to say the elastic line, of the flexible tracks throughout the deployment of the system. This deflection, and therefore the stiffness of the flexible tracks, generates a contact force Fc applied at the point of contact P between the flexible tracks. By reaction to the contact force Fc, a reaction force Fr is generated by the winding means.

An appropriate dimensioning of the winding tracks makes it possible to confer upon them the desired stiffness and thus control the forces Fc and Fr, and consequently the torque generated. It should be observed that the profile or the form of the winding tracks may comprise one or more spiral portions and/or circular arcs.

The solution proposed by the present invention makes it possible to obtain a torque strictly adapted to the demand throughout the deployment of the structure.

The invention claimed is:

1. A motorization device, comprising:
    two winding cylinders being substantially parallel;
    a winding means for forming a longitudinal link element being capable of maintaining a predetermined distance between the two winding cylinders and being wound around the two winding cylinders, and having a crossover point between two substantially linear sections of the winding means situated between the two winding cylinders;
    a flexible track being fixed to each of the two winding cylinders, each of the two winding cylinders and a respective flexible track defining a fitting, the flexible tracks being arranged facing one another and having a point of contact, a prestressing force being applied at said point of contact of the flexible tracks under an effect of the winding means, the flexible tracks having a spiral form being configured in such a way that the point of contact between the flexible tracks is offset relative to the crossover point of the winding means, the point of contact and the crossover point not being aligned on a same axis parallel to axes of revolution of the two winding cylinders, such that a torque dependent on a distance between the point of contact and the crossover point is applied, the torque being able to provoke mutual rotation of the fittings,
    wherein each of the two winding cylinders has a first circumference over a determined first portion and a second circumference over a determined second portion,
    wherein the first circumference is different than the second circumference, and
    wherein each of the two substantially linear sections of the winding means is wound on a determined first portion of a respective one of the two winding cylinders and on a determined second portion of a respective other of the two winding cylinders.

2. The motorization device of claim 1, wherein said first portion and said second portion of each of the two winding cylinders have a circular circumference.

3. The motorization device according to claim 1, wherein a value of a first distance between the crossover point and a horizontal plane containing the axes of revolution of the two winding cylinders is equal to a determined first value for controlling the torque, the torque being exerted at the point of contact.

4. The motorization device of claim 3, wherein the spiral form of the flexible tracks is configured such that a second distance between the point of contact and the plane containing the axes of revolution of the two winding cylinders is equal to a determined second value, a sum of the first distance and the second distance determining the torque that is exerted at the point of contact.

5. A deploying system for a satellite, the deploying system comprising:
    at least one first deployable appendage,
    one second deployable appendage, and
    a motorization device according to claim 1,
    wherein the at least one first deployable appendage and the one second deployable appendage being fixed to each fitting of the motorization device.

* * * * *